United States Patent [19]
Jungersen et al.

[11] 3,805,336
[45] Apr. 23, 1974

[54] HARNESS BUCKLE DEVICE

[75] Inventors: Thoger G. Jungersen; Thoger G. Jungersen, Jr., both of New Providence, N.J.

[73] Assignee: Stephen L. Snyder, Cherry Hill, N.J.

[22] Filed: Mar. 3, 1972

[21] Appl. No.: 231,507

[52] U.S. Cl. ........................ 24/230 AU, 24/241 SL
[51] Int. Cl. ...................... A44b 11/25, A44b 13/00
[58] Field of Search.... 24/230 AD, 241 PS, 241 SL; 244/151 A, 151 R

[56] References Cited
UNITED STATES PATENTS

| | | | |
|---|---|---|---|
| 1,299,821 | 4/1919 | Hancock | 24/241 SL |
| 2,276,628 | 3/1942 | Quilter | 24/261 PS |
| 3,624,674 | 11/1971 | Gaylord | 24/230 AV |
| 444,717 | 1/1891 | Stout | 24/241 SL |
| 456,137 | 7/1891 | Clary | 24/241 SL |
| 855,368 | 5/1907 | Watson | 24/241 PS |

FOREIGN PATENTS OR APPLICATIONS

| | | | |
|---|---|---|---|
| 113,101 | 5/1941 | Australia | 24/241 SL |
| 720,220 | 2/1932 | France | 24/241 SL |

*Primary Examiner*—Bernard A. Gelak
*Attorney, Agent, or Firm*—Clarence A. O'Brien; Harvey B. Jacobson

[57] ABSTRACT

A body harness is releasably connected to the riser webs of a parachute by buckle connector devices. Each connector device features a pivotal connection that is disassembled or released under the tension of the riser webs when a pivot receiving formation on a positioning member is angularly displaced in one direction. A releasable lock holds the positioning member in a lock position to hold a pivot portion of the connector device in engagement with a deflector extension of the connector frame, within which the positioning member is rotatably mounted.

5 Claims, 8 Drawing Figures

PATENTED APR 23 1974 3,805,336

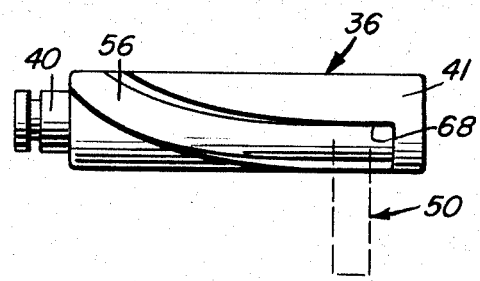
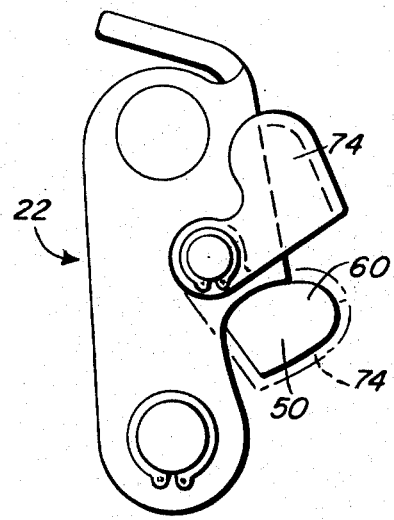
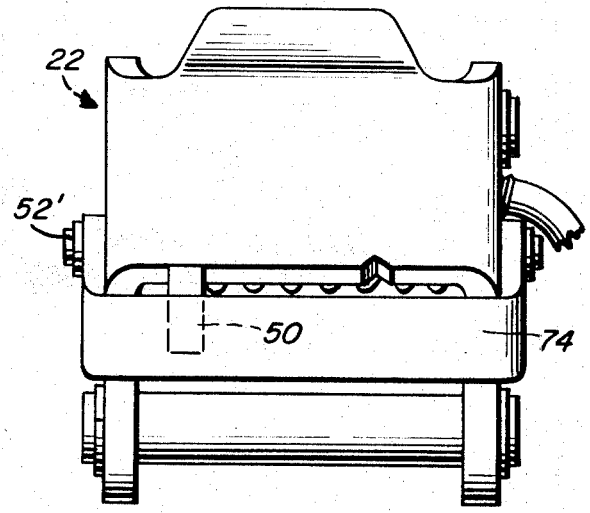
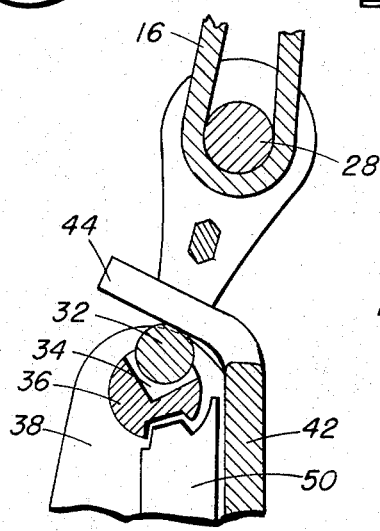

HARNESS BUCKLE DEVICE

This invention relates to releasable connections between a parachute canopy and pay load harness and more particularly to a novel type of releasable connector.

Because of the desirability of promptly disconnecting a parachute canopy from the parachute pay load under different conditions, various releasable lock devices have been devised between the pay load harness and the riser web. Such releasable lock devices are often unsatisfactory because some can release unintentionally with fatal consequences or some are so difficult to release as to make them worthless. For example, it is often necessary to simultaneously release a pair of connector devices by a single activation of a remote actuator without any delay especially in military and sport jumping. A manual override for individual release of the connector devices is also necessary in such installations. It is therefore an important object of the present invention to provide a releasable connector device for use in the aforementioned environment whereby a reliable connection is established that is readily disconnected.

In accordance with the present invention, the releasable connector device includes a frame member anchored to one web portion and a complimentary member such as a bail secured to an adjacent web portion. The two connector members are pivotally interconnected so as to transmit tension from one web portion to the other along a plane common to the adjacent ends of the web portions. The pivotal connection is established between a pivotal portion on one of the connector members and a receptacle formation, recess or slot, in a positioning member rotatably mounted by the other connector part. The connector part within which the positioning member is rotatably mounted, constitutes a frame from which a deflector extension projects transverse and at an angle to the directional plane of the tensile forces transmitted by the connector device between the interconnected web portions. A lock mechanism is mounted by the frame for engagement with the rotatable positioning member in order to prevent angular displacement thereof from a lock position in which the pivotal portion is held in engagement with the camming extension.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a front elevational view of a rotary positioning member disassembled from the connector device.

FIG. 6 is a side elevational view of a modified form of connector device.

FIG. 7 is a front elevational view of the connector device shown in FIG. 5.

FIG. 8 is a partial side sectional view of the device illustrated in FIGS. 2, 3 and 4, showing the device disengaging.

Figure 1:
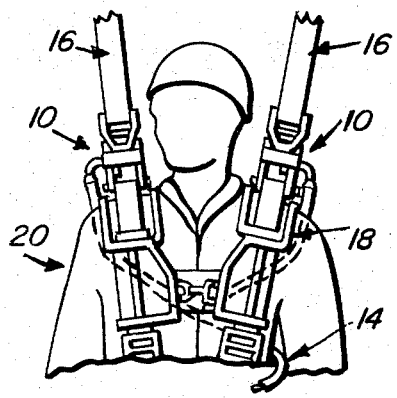
FIG. 1 is a partial front elevational view of a chutist wearing a body harness with the riser webs releasably connected thereto by connector devices constructed in accordance with the present invention.

Referring now to the drawings in detail, FIG. 1 illustrates a typical installation for each of two connector devices generally referred to by reference numeral 10, each connector device being shown interconnecting a riser 16 extending to the suspension lines of a parachute canopy (not shown) and a body harness 18 secured to a payload, as for example, the chutist 20. The connector devices are adapted to be simultaneously released through an actuating, push-pull cable assembly 14. It should, of course, be appreciated that the connector devices 10 may be installed at other suitable locations.

Figure 2:
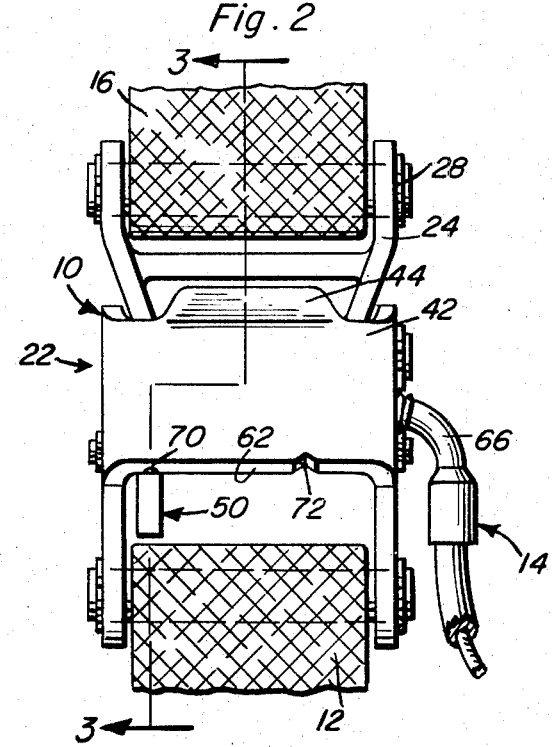
FIG. 2 is a front elevational view of one of the connector devices.
Figure 4:
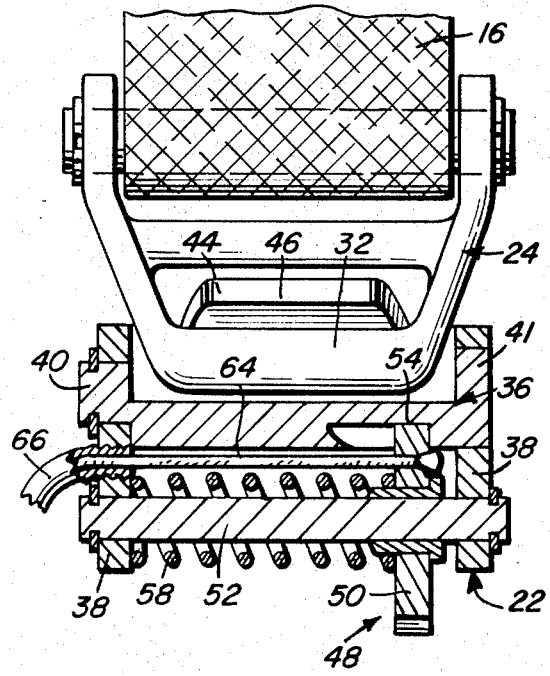
FIG. 4 is a partial sectional view taken substantially through a plane indicated by section line 4—4 in FIG. 3.
Figure 3:
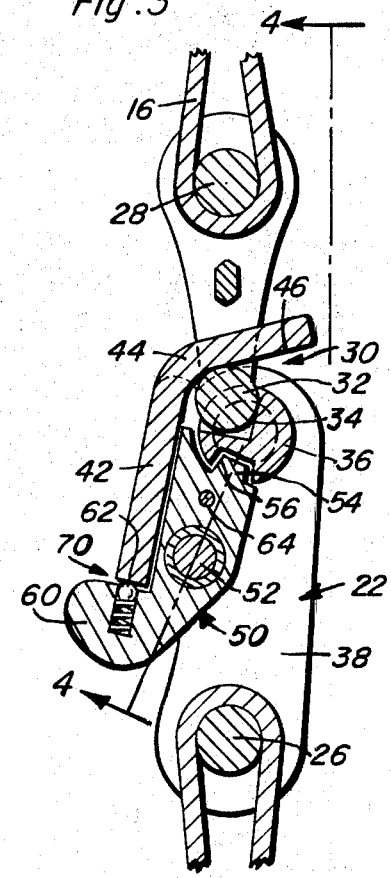
FIG. 3 is a side sectional view taken substantially through a plane indicated by section line 3—3 in FIG. 2.

As more clearly seen in FIGS. 2, 3 and 4, the connector device 10 includes two interengaged parts such as a frame generally referred to by reference numeral 22 to which the harness webbing 12 is secured and a bail or link member 24 to which the web portion 16 is secured. In the illustrated embodiment, the interconnected web portions 12 and 16 are respectively looped about rods or bars 26 and 28 respectively fixed to the frame 22 and the bail member 24. Thus, when the web portions are under tension, tensile forces are transmitted through the frame and bail member in alignment with a common plane through which the tensile forces are directed because of a pivot assembly 30 pivotally interconnecting the two parts. The pivot assembly includes a pivot shaft portion or crossbar 32 forming part of the bail member 24 and a receptacle formation 34 on a positioning member 36 mounted by the frame 22. The formation 34 is in the form of a slot, recess or cavity.

The frame 22 includes a pair of parallel spaced plate portions 38 interconnected adjacent one end of the bar 26 about which the web portion 12 is looped. The plate portions 38 are spaced from each other adjacent the end opposite the bar 26 by the positioning member 36 which, in the illustrated embodiment, is generally cylindrical in shape and is provided at its opposite axial ends with bearing portions 40 and 41 received within bearing openings in the plate portions 38. The plate portions 38 are also interconnected on one longitudinal side by a connecting portion 42 as more clearly seen in FIG. 3 from which a deflector extension 44 extends in close spaced relation to the rotatable positioning member 36. The deflector 44 extends at an angle to the direction along which forces are transmitted between the web portions so that the pivot shaft portion 32 when received within the formation or cavity 34 may be wedgedly locked to the frame between the positioning member 36 and the deflector as shown in FIG. 3. It will furthermore be apparent that a pull on the bail member 24 by the tension in the web portion 16 relative to the web portion 12, will urge angular displacement of the positioning member in a clockwise direction as seen in FIG. 3 in view of the relative inclination of the surface 46 of the deflector engaged by the pivot shaft portion 32. Therefore, when the positioning member 36 is free to rotate or is rotated clockwise, the shaft portion 32 will be displaced laterally of the direction of the tensile forces transmitted by the connector device thereby causing disassembly of the pivot assembly 30.

In order to effect disassembly of the pivot assembly 30 or release of the connector device, an activating mechanism 48 is mounted on the frame 22 for engagement with the positioning member 36. In the illustrated embodiment, the mechanism 48 includes an actuating lock element 50 slidably mounted on a shaft 52 which is fixedly interconnected between the frame plate portions 38 intermediate the opposite longitudinal ends thereof. The lock element includes at one end an engaging formation 54 received within a spiral groove 56 formed in the positioning member 36 so that axial displacement of the lock element along the shaft 52 parallel to the rotational axis of the positioning member 36, will cause angular displacement of the positioning member. The element 50 is yieldably held in a locking position by a compression spring 58 mounted on the shaft 52 and reacting between the lock element 50 and one of the side plate portions 38 as more clearly seen in FIG. 2. The lock element 50 may be axially displaced from its lock position as shown by solid lines in FIG. 2 to a release position against the bias of spring 58 by any suitable means such as a remote cable actuator 14. Also, a manual override may be provided in the form of a lower projecting portion 60 of the lock element as more clearly seen in FIG. 3 that is engageable by the thumb or finger for manual displacement along the guide edge 62 of the frame portion 42 thereby producing angular displacement of the positioning member in a clockwise direction as shown in FIG. 3, to a releasing position.

It will be apparent from the foregoing description, that the releasable connector device 10 of the present invention provides for pivotal interconnection of two releasably connected parts so that the connector device may be operatively aligned along the direction of force transmission. While transmitting tensile force, the deflector 44 continuously urges disassembly of the pivot connection in order to ensure prompt disconnection when activating the mechanism 48. Release by the mechanism 48 is characterized by angular displacement of the positioning member in one direction so as to permit lateral movement of the pivot shaft portion 32 thereby effecting a disconnection.

In the illustrated embodiment of FIGS. 2 and 4, the cable actuator 14 includes a cable 64 connected to the element 50 for displacement thereof in one direction against the bias of spring 58. The cable extends to a remote actuator through cable sheathing swivelly connected by the elbow 66 to the frame.

Additional releasable lock or detent devices may be utilized to prevent unintentional release as a safety measure. It is common knowledge, in this regard, that military requirements call for a two directional release action for releasable connector devices in parachute installations.

As shown in FIG. 5, a formation or flat 68 is provided at one end of the spiral groove 56 in the positioning member 36 in order to releasably hold the element 50 in the lock position. When the element is displaced to a release position, it may be releasably held in the release position by a ball detent 70 carried by the element 50. Thus, the ball detent is spring biased into a detent notch 72 formed in the guide edge 62, when the element 50 is in the release position.

Another safety locking feature is shown in FIGS. 6 and 7, wherein the bar 52' is an axially extended version of the bar 52 of FIG. 4 pivotally supporting a cover 74. In the lowered position of the cover 74 as shown in FIG. 7 and by dotted line in FIG. 6, the projecting portion 60 of the element 50 is enclosed so that it cannot be displaced from its lock position. The cover 74 must be raised to the position shown by solid line in FIG. 6, before the element can be activated as hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. In combination with adjacent web portions, a device for releasably interconnecting said adjacent web portions comprising a frame connected to one of the web portions, connector means secured to the other of the web portions and having a crossbar for transmitting tensile forces substantially in a plane aligned with both of said web portions, a positioning member having a formation receiving the crossbar, means rotatably mounting the positioning member on the frame about a rotational axis in close adjacency to said receiving formation, deflector means mounted on the frame in intersecting relation to said plane and in engagement with the crossbar for guiding movement of the crossbar laterally across said plane, and lock means engageable with the positioning member for preventing rotational movement thereof from a position holding the cross bar wedged against the deflector means, said lock means including a portion of the frame one one side of said plane from which the deflector means extends, and an actuating element laterally slidable along said portion of the frame in engagement with the positioning member, said positioning member being rotatable by the slidable movement of the actuating element.

2. The combination of claim 1, including guide means mounted on said portion of the frame for constraining movement of the actuating element in one direction between lock and release positions, and safety means displaceable in another direction for releasably holding the actuating element in said lock position.

3. The combination of claim 2 wherein the safety means includes a cover member pivotally mounted on the frame.

4. The combination of claim 2 including detent means for releasably holding the lock means in the lock and release positions.

5. The combination of claim 1, including safety means mounted by the frame member for displacement in a direction different from the actuating element to releasably hold the positioning member in a lock position.

* * * * *